(12) United States Patent
Parenti et al.

(10) Patent No.: US 12,081,438 B2
(45) Date of Patent: Sep. 3, 2024

(54) AUTOMATIC POLICY ENGINE SELECTION

(71) Applicant: Hewlett Packard Enterprise Development LP, Houston, TX (US)

(72) Inventors: Mark A. Parenti, Milford, NH (US); Timothy M. Ireland, Westford, MA (US); Mathieu Riverin, Littleton, MA (US); Rajaseelan Manavalan, Fremont, CA (US); Marek Tomasz Telus, Hopkinton, NH (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 380 days.

(21) Appl. No.: 17/498,477

(22) Filed: Oct. 11, 2021

(65) Prior Publication Data

US 2023/0112579 A1    Apr. 13, 2023

(51) Int. Cl.
| | |
|---|---|
| *H04L 47/20* | (2022.01) |
| *H04L 9/40* | (2022.01) |
| *H04L 41/08* | (2022.01) |
| *H04L 41/0894* | (2022.01) |
| *H04L 41/0895* | (2022.01) |

(52) U.S. Cl.
CPC .............. *H04L 47/20* (2013.01); *H04L 41/08* (2013.01); *H04L 41/0894* (2022.05); *H04L 41/0895* (2022.05); *H04L 63/20* (2013.01); *H04L 63/205* (2013.01)

(58) Field of Classification Search
CPC ..... H04L 47/20; H04L 41/08; H04L 41/0894; H04L 41/0895; H04L 63/20; H04L 63/205
See application file for complete search history.

(56) References Cited

U.S. PATENT DOCUMENTS

| | | | |
|---|---|---|---|
| 5,968,176 A * | 10/1999 | Nessett | H04L 63/0227 |
| | | | 726/11 |
| 6,732,168 B1 * | 5/2004 | Bearden | H04L 47/24 |
| | | | 709/223 |

(Continued)

FOREIGN PATENT DOCUMENTS

| | | | | |
|---|---|---|---|---|
| CA | 2292272 A1 * | 6/2000 | ......... | H04L 12/2602 |
| CA | 2511531 C * | 12/2013 | ............. | G06F 21/10 |

(Continued)

*Primary Examiner* — Emmanuel L Moise
*Assistant Examiner* — Robert A Shaw
(74) *Attorney, Agent, or Firm* — Park, Vaughan, Fleming & Dowler LLP (57) ABSTRACT

One aspect of the instant application facilitates automatic policy engine selection. During operation, a system can monitor a network including a set of network devices. The system can receive, based on the monitoring, a set of attributes associated with the network. At least two network devices are equipped with a different policy enforcement engine for enforcing one or more given policy rules. The system can apply a unified policy model to determine, based on the set of attributes, an assignment of the one or more given policy rules to the first policy enforcement engine and the second policy enforcement engine for providing an optimized policy enforcement. The system may then select based on the assignment, one or both of the first policy enforcement engine and the second policy enforcement engine. The system may activate the selected one or both policy enforcement engines for enforcing the given policy rules.

20 Claims, 6 Drawing Sheets

(56) References Cited

U.S. PATENT DOCUMENTS

| | | | |
|---|---|---|---|
| 11,374,980 B1* | 6/2022 | Appala | H04L 41/0894 |
| 2004/0039803 A1* | 2/2004 | Law | H04L 41/0893 |
| | | | 709/223 |
| 2005/0138204 A1* | 6/2005 | Iyer | H04L 61/4523 |
| | | | 709/242 |
| 2006/0048142 A1* | 3/2006 | Roese | H04L 63/1416 |
| | | | 717/176 |
| 2006/0143715 A1* | 6/2006 | Chow | G06F 21/629 |
| | | | 726/27 |
| 2007/0156659 A1* | 7/2007 | Lim | G06F 21/6227 |
| 2007/0180490 A1* | 8/2007 | Renzi | G06F 21/604 |
| | | | 726/1 |
| 2007/0192823 A1* | 8/2007 | Andersen | H04L 41/0893 |
| | | | 726/1 |
| 2012/0166604 A1* | 6/2012 | Fortier | H04L 41/0893 |
| | | | 709/223 |
| 2012/0166642 A1* | 6/2012 | Saint Clair | H04L 12/2838 |
| | | | 709/225 |
| 2013/0160136 A1* | 6/2013 | Branson | G06F 21/52 |
| | | | 726/26 |
| 2014/0040975 A1* | 2/2014 | Raleigh | H04L 12/1435 |
| | | | 726/1 |
| 2014/0165134 A1* | 6/2014 | Goldschlag | G06F 21/62 |
| | | | 726/1 |
| 2015/0128211 A1* | 5/2015 | Kirner | H04L 63/20 |
| | | | 726/1 |
| 2015/0249684 A1* | 9/2015 | Zhang | G06Q 10/10 |
| | | | 726/1 |
| 2016/0212166 A1* | 7/2016 | Henry | G06F 21/604 |
| 2016/0212168 A1* | 7/2016 | Dotan | H04L 63/20 |
| 2016/0294646 A1* | 10/2016 | Kirner | H04L 41/0893 |
| 2018/0278478 A1* | 9/2018 | Prasad | H04L 41/0894 |
| 2020/0228571 A1* | 7/2020 | Aharchaou | H04L 63/08 |
| 2021/0135995 A1* | 5/2021 | Saklikar | H04L 43/08 |
| 2023/0104129 A1* | 4/2023 | Miriyala | G06F 9/541 |
| | | | 709/220 |

FOREIGN PATENT DOCUMENTS

| | | | | |
|---|---|---|---|---|
| EP | 1026867 A2 | * | 8/2000 | H04L 12/2602 |
| EP | 1143665 A2 | * | 10/2001 | H04L 12/4641 |
| WO | WO-9854644 A1 | * | 12/1998 | H04L 63/02 |
| WO | WO-2004002062 A1 | * | 12/2003 | H04L 41/06 |
| WO | WO-2015139724 A1 | * | 9/2015 | H04L 41/022 |

* cited by examiner

AUTOMATIC POLICY ENGINE SELECTION

BACKGROUND

This disclosure is generally related to a field of network management and networking policies. In general, a network can include a plurality of interconnected network devices, with at least one or more network devices implementing a policy enforcement engine. In a typical network, a plurality of different policy enforcement engines can exist along a network path for enforcing networking policies to manage network traffic. Each policy enforcement engine can be associate with different performance characteristics and capabilities.

BRIEF DESCRIPTION OF THE FIGURES

In the figures, like reference numerals refer to the same figure elements.

DETAILED DESCRIPTION

The following description is presented to enable any person skilled in the art to make and use the examples and is provided in the context of a particular application and its requirements. Various modifications to the disclosed examples will be readily apparent to those skilled in the art, and the general principles defined herein may be applied to other examples and applications without departing from the spirit and scope of the present disclosure. Thus, the scope of the present disclosure is not limited to the examples shown but is to be accorded the widest scope consistent with the principles and features disclosed herein.

Various network devices residing in a network can be equipped with a policy enforcement engine. A policy enforcement engine can be a software component or a hardware component that can implement a set of networking policies. For example, access control list (ACLs) can be a networking policy that can allow a user to specify rules using an Application Programming Interface (API) to deny a specific type of traffic. Further, networking policies can also correspond to forwarding rules, e.g., Policy Based Forwarding (PBF), or firewall rules. Different policy enforcement engines can be associated with different types of API's. For example, one API may support a certain way of describing or representing a policy while another API may use a different policy representation language.

Each policy enforcement engine can enforce one or more networking policies for managing network traffic. For example, one policy enforcement engine in a first network device along a network traffic path can enforce network security policies and another policy enforcement engine in a second network device along the network traffic path can enforce traffic management policies. In other words, ACLs in a network switch can correspond to the first policy enforcement engine, Firewall rules in firewall appliances or distributed firewalls can correspond to the second policy enforcement engine.

Different types of policy enforcement engines can be associated with a different Application Programming Interface (API). Each type of API can represent the policies with a different terminology. For example, an API associated with a first policy enforcement engine can represent a policy function with a specific terminology while another API associated with a second policy enforcement engine can represent a similar policy function with a different terminology. Although, the existence of different types of policy enforcement engines along a network path can provide flexibility to network administrators, configuring them manually with different management APIs can be difficult and complex. This is because it can be difficult and complex for a user to learn different terminologies associated with different policy enforcement engines and then to manually configure them. In addition, there can be additional complexity involved when determining, based on the management APIs, which of these enforcers (or policy enforcement engines) are appropriate for a given network traffic flow. This is because the user may have to take into consideration a complex set of attributes, e.g., network path efficiency, available network device resources, device performance, and other device related capabilities, when configuring policies for managing network traffic flows. Moreover, given the different variations in the network, manually configuring the policy enforcement engines can be a difficult task.

Some of the aspects described in this application provide a technical solution to the above-mentioned technical problems by providing a system and method for automatically selecting a policy enforcement engine via a unified policy broker. For example, the system may normalize different terminologies, workflows, and capabilities across different policy enforcement engines. The system may then provide a set of normalized workflows across the different policy enforcement engines so that the system can automatically configure network policies on these engines that may interact and complement each other. In other words, a system may provide the user the flexibility of creating a policy rule using a same service group or qualifiers, e.g., applications. The system may then, based on the monitoring, automatically change a policy type or enforcer to be either a network ACL type enforcer or a distributed firewall type enforcer. In response to selecting the specific type of enforcer the system may ensure that the created policy rule is rendered with correct implementation. Specifically, given a unified language or API for defining rules, the system can automatically switch back and forth between different implementations, e.g., east-west firewalls, given a common set of capabilities. The system may also validate that the rule can be applied on a new target enforcer, thereby allowing a seamless migration between different enforcers.

Specifically, the system can automatically monitor the network to obtain information associated with different policy models (or APIs) associated with respective policy enforcement engines in the network. In other words, the system can obtain information about how each of the policy models create policies, define policies, and define policy rules, etc. Based on this information the system can create a mapping between a unified policy model and the different policy models. Such a unified policy model can provide a unified API for configuring and managing the different policy enforcement engines with different policy models via a user interface.

In another aspect described in this application, the system can dynamically monitor the network to obtain a set of attributes related to the network and the network devices residing in the network. These attributes can include different capabilities, performance characteristics, traffic enforcement options, resource availability associated with a respective policy enforcement engine, path efficiency, etc. The system can automatically select, based on the unified policy model (or unified API) and the set of attributes, one or more policy enforcement engines to enforce a given set of policy rules in a way that results in an optimized policy enforcement for a given network traffic flow.

The phrase "policy enforcement engine" refers to a software and/or hardware component in a network device that can enforce a set of policy rules.

The phrases "policy enforcement engine" and "enforcer" are used interchangeably in this application.

System Architecture

Figure 1:
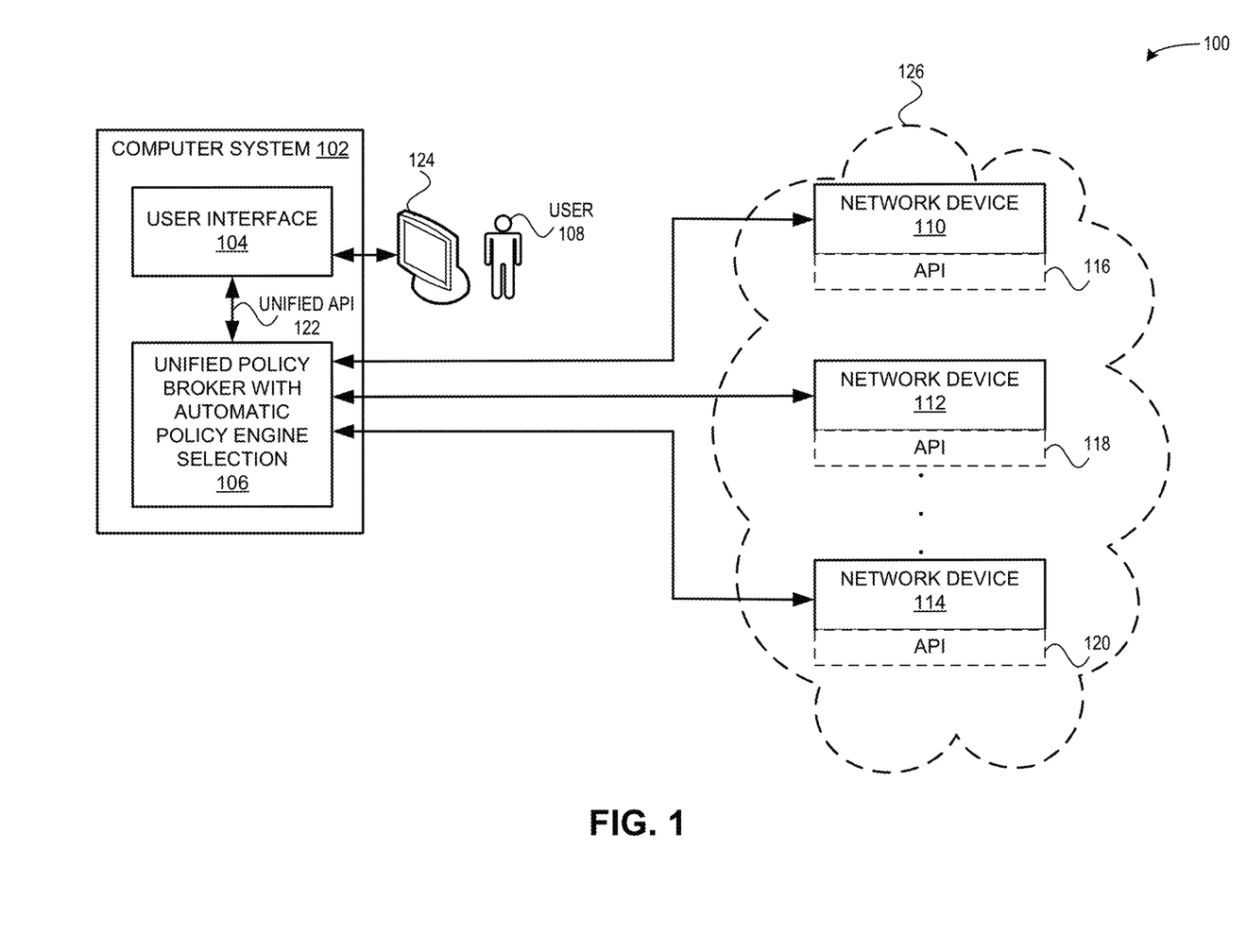
FIG. 1 illustrates an example network environment including a computer system for facilitating automatic policy engine selection using a unified policy broker, according to one aspect of the instant application.

FIG. 1 illustrates an example network environment including a computer system for facilitating automatic policy engine selection using a unified policy broker, according to one aspect of the instant application. In the example shown in FIG. 1, environment 100 shows a set of network devices or network appliances, e.g., network devices 110-114, residing in a network 126. Network devices 110-114, e.g., network switches, can implement networking policies based on a corresponding policy enforcement engine. These networking policies can include a set of forwarding rules that can be applied to a packet when some match criteria are satisfied.

For example, one network device may support ACL type policy enforcement engine while another network device may support a firewall type policy enforcement engine. Further, the firewall type of policy enforcement engine may have a similar policy related functionality as the ACL type of policy enforcement engine. However, each policy enforcement engine can be associated with its own type of API, e.g., APIs 116-120. In other words, an API associated with a policy enforcement engine can include different terminologies and representations for a policy function when compared to another API for a similar policy function, e.g., a policy function can be associated with policies, policy enforcement choices (allow, deny, reject, etc.), policy rules, traffic specification, etc.

Manually managing and configuring these different policy enforcement engines associated with a specific API can be complex and difficult. This is because the user may have to have knowledge of the different terminologies used across the different policy enforcement engines for different and similar policy functions. Further, the user may have to have knowledge of the capabilities, available computational and memory resources at the network device, and path efficiency along a network path, to be able to configure the appropriate policy enforcement engines to deliver the network flow in an efficient way with desired performance attributes.

One aspect described in this application can provide a technical solution to the above-mentioned problems by providing a unified policy broker that can facilitate automatic selection of policy enforcement engines. A unified policy broker with automatic policy engine selection 106 can facilitate the management of different policy enforcement engines with a unified API via a user interface 104. For example, a computer system 102 implementing element 106 can provide a single point of control to configure various types of policies across the different policy enforcement engines using a unified or single set of policy definitions and structural elements. Further, unified policy broker with automatic policy engine selection 106 can in addition to providing a unified API, can also accommodate the differences that exist across the policy enforcement engines, e.g., different capabilities, performance characteristics, traffic enforcement options, resource availability, etc.

Further, element 106 can provide unified API 122 via a user interface (UI) 104 associated with a display device 124 to configure and manage the different policy enforcement engines. In one aspect of this application, system 102 can provide a visualization to a user 108 via a graphical user interface about how different policies can be enforced for a given network traffic flow across multiple policy enforcement engines. Element 106 can further determine and select a set of enforcers based on one or more attributes, e.g., available computational resources at a network device, efficiency of a likely network path taken by a given network traffic flow, latency added to network traffic, etc. Therefore, element 106 can facilitate the automatic selection of policy enforcement engines using a unified policy broker without a user manually making such a selection to ensure an optimized policy enforcement given the network traffic flow and policy. The operations of unified policy broker with automatic policy engine selection 106 is described below with reference to FIGS. 2-5.

Figure 2:
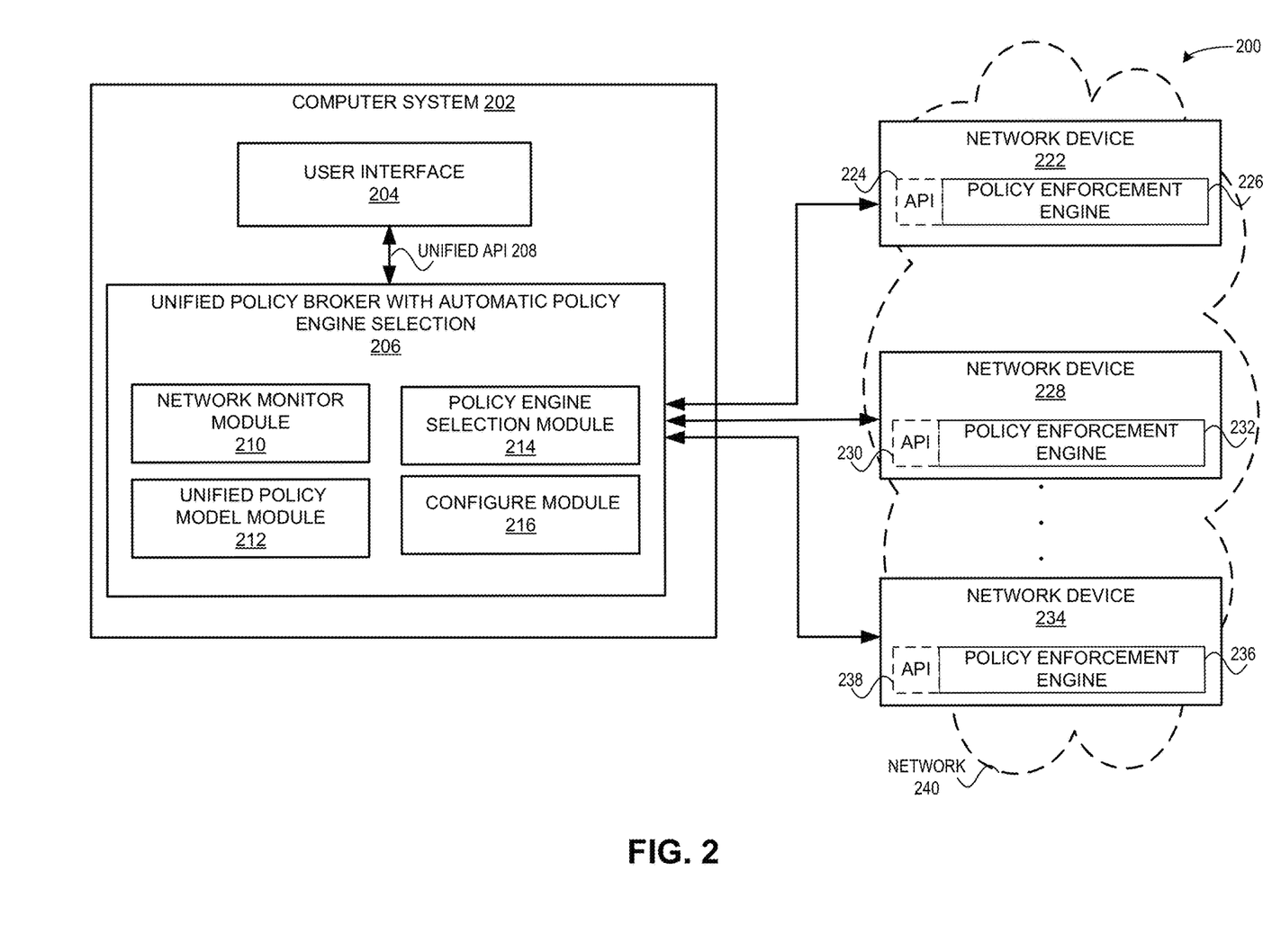
FIG. 2 illustrates an example system architecture for facilitating automatic policy engine selection based on a unified policy broker, according to one aspect of the instant application.

FIG. 2 illustrates an example system architecture for facilitating automatic policy engine selection based on a unified policy broker, according to one aspect of the instant application. In the example shown in FIG. 2, system architecture 200 can include a computer system 202 with an integrated controller or a unified policy broker with automatic policy engine selection 206 for configuring and managing different policy enforcement engines associated with network devices in a network 240. Network 240 can include a group of interconnected network devices, e.g., 222, 228, and 234. At least two or more network devices in network 240 can include a policy enforcement engine. For example, network devices 222, 228, and 234 can include policy enforcement engines 226, 232, and 236, respectively.

Unified policy broker with Automatic Policy Selection (UAPS) 206 can include a network monitor module 210 that can implement a monitoring mechanism to provide a broad visibility into various attributes associated with network 240, e.g., virtual networking infrastructure running on servers; other kind of data that can facilitate in determining a path taken by network traffic; configuration information associated with a server, a network device, and other configuration information associated with virtual networking.

Network monitor module 210 may also monitor and retrieve information associated with capabilities and resource availability in a network device residing in the network; information related to efficiency of a network path based on the different policy enforcement engines along that network path, etc. For example, a network switch supporting an ACL type policy enforcement engine can provide a limited resource capability whereas a network appliance supporting a firewall type policy enforcement engine can support a large number of policy rules, e.g., in the order of thousands or millions of policy rules, and hence can provide an enhanced resource capability. Further, network monitor module 210 can retrieve network information that can provide end-to-end visibility, e.g., monitoring a path taken by network traffic to enable UAPS 206 to apply specific policy rules. For example, UAPS 206 may determine, for a given network traffic flow, the different types of policy enforcement engines that exist along a path between a first virtual machine on a first host and a second virtual machine on a second host. UAPS 206 may then select one or more policy enforcement engines along the network path to apply a certain policy rule for managing network traffic traversing from the first virtual machine to the second virtual machine. Network monitor module 210 may not be limited to monitoring the above-mentioned attributes but can also extend to provide visibility into virtual networking stacks and other network attributes that can provide an improved perspective of the network environment to determine an optimized selection of policy enforcement engines.

Further, network monitor module 210 can act as a sensor to monitor live changes in the network and the network device, i.e., dynamic and real-time changes. In other words, network monitor module 210 can monitor the network to retrieve information that is desirable for automatically selecting one or more policy enforcement engines to provide an optimized policy enforcement. Optimized policy enforcement can indicate that enforcing a set of policy rules by the selected policy enforcement engines can result in an optimized performance in terms of resource utilization, path efficiency, latencies involved, and other performance characteristics. For example, UAPS 206 can provide an optimized performance when some performance criteria are satisfied. The performance criteria can involve ensuring that enforcing a policy rule by one policy enforcement engine does not conflict with another policy rule enforced by another policy enforcement engine; ensuring that an assignment of one or more policy rules among the different policy enforcement engines along a network path for a given network traffic flow results in an improved path efficiency; ensuring that an amount of latency added by the selected policy enforcement engines is below a latency threshold, etc.

Each policy enforcement engine has its own user interface and API. For example, policy enforcement engines 226, 232, and 236 can be associated with APIs 224, 230, and 238, respectively. API 224 associated with a policy enforcement engine 226 can use a specific terminology for defining a policy function, e.g., policy rules, traffic specification, enforcement choices, e.g., allow, deny, reject, etc. API 230 associated with policy enforcement engine 232 can use a different terminology for a similar policy function. In existing systems, a user may apply a policy enforcement engine specific API to configure the policy enforcement engine. In other words, a user is desired to have knowledge of the different terminologies and definitions used across different APIs for similar policy functions on different policy enforcement engines to be able to configure the policy enforcement engines.

Further, due to the diverse set of APIs the user may find it difficult and complex to figure out how the different policy functions associated with different policy enforcement engines interact and/or are interrelated to each other. Understanding such an interrelation between different policy enforcement engines that exist along a network path can be relevant to ensure that the operations of the policy enforcement engines do not conflict with each other. In other words, a user may configure an ACL type policy enforcement engine in a first network device to allow network traffic to be forwarded to a second network device. If the second network device is a firewall appliance, the user may have to ensure that the firewall type policy enforcement engine is not configured to block the network traffic.

With the increase in the different types of policy enforcement engines in a network environment and with each policy enforcement engine having its own interface and API, can make the manual configuring and management of the policy enforcement engines difficult and complex. For example, since the different types of policy enforcement engines can exist along an end-to-end physical or logical network, the user may have to go to each one of these infrastructures and understand which type of policies can be interrelated to each other so that a uniform and consistent policy enforcement is applied along the network path associated with the network traffic.

Unified policy model module 212 can provide a unified API that can be applied via a user interface 204 for configuring and managing the different types of policy enforcement engines deployed in the network environment, thereby enabling a user to interact with the different types of policy enforcement engines using a single point of control or a unified API. UAPS 206 can apply unified policy model module 212 to translate the different descriptions or representations for similar policy functions into a unified description.

In other words, with the unified API and a single user interface the user can configure and manage the different types of policy enforcement engines without the burden of learning and understanding the different terminologies used across different APIs. Specifically, unified policy model module 212 can, based on the information obtained by network monitor module 210, convert the different terminologies associated with the different policy enforcement engines and its respective API into a unified terminology, i.e., translate the different terminologies into a unified representation.

For example, unified policy model module 212 may obtain the existing policy definitions configured for different network devices in the network environment (with each network device providing a different policy enforcement engine) and can create a mapping between a unified policy model and different policy models associated with respective policy enforcement engines. Such a unified policy model can be used to provide a unified API for configuring and managing the different policy enforcement engines via a user interface. In other words, unified policy model module 212 can create a unified object model for the various policy enforcement engines that perform similar policy functions. Further, unified policy model module 212 can also accommodate and retain some of relevant differences that exist among the different policy enforcement engines, e.g., performance characteristics, traffic enforcement options, capabilities, etc.

Unified policy model module 212 can provide a unified policy broker that can enable a user to configure and manage the different policy enforcement engines using a single point of control or a unified API. However, the user may have to have knowledge of a complex set of attributes, e.g., network path efficiency, available network device resources, device performance, and other capabilities, to configure and manage the different policy enforcement engines. Further, performing this configuration manually can be difficult given the potential variations in the network. In one aspect of this application, UAPS 206 can also include a mechanism that can automatically configure and manage the different policy enforcement engines available in network 240. For example, UAPS 206 may apply a policy engine selection module 214 to automatically analyze the information retrieved by network monitor module 210, e.g., information related to resource (e.g., amount of memory) available at a network device, latencies along a network path, virtual machines along the network path, path efficiency give the different policy enforcement engines along the network path, etc.

In one aspect, policy engine selection module 214 can determine, based on the information obtained from network monitor module 210 and unified policy model module 212, the different types of policy enforcement engines that exist along a network path for a given network traffic flow. For example, for a given network traffic flow the network path may include at one end a firewall type policy enforcement engine and the other end may not include such a firewall type of policy enforcement engine, in such a case policy engine selection module 214 may determine other policy enforcement engines that the network traffic may traverse and select one or more policy enforcement engines to provide a desirable policy enforcement.

In another example, network traffic may traverse a specific network path including an ACL type policy enforcement engine and a firewall type policy enforcement engine. In such a case, policy engine selection module 214 may determine, based on the information retrieved by network monitor module 210 and unified API, that the firewall type of enforcer is applicable to the given type of network traffic and traffic flow.

In another example, when a user specifies the network traffic at a layer-2 level, police engine selection module 214 may select the ACL type of enforcer instead of a firewall type of enforcer, this is because a firewall network appliance may support layer-3 from a networking concept.

Furthermore, policy engine selection module 214 can select one or more policy enforcement engines, based on the diverse attributes retrieved by network monitor module 210, to ensure that the given network traffic flow is delivered in an efficient way with desired performance attributes. Therefore, policy engine selection module 214 can apply different factors to select an appropriate enforcer for the given network traffic flow.

In another example, when there exist a large number of movements with respect to virtual machines, e.g., a virtual machine migrating from one host to another, in a data center, existing systems may often find it difficult to track such movement. In one aspect of this application, policy engine selection module 214 can apply the different network attributes derived from the network (by network monitor module 210) to determine a current location of the virtual machine and can then apply an appropriate policy rule associated with a policy enforcement engine deployed on the virtualization host and that is applicable to a given virtual machine. Therefore, UAPS 206 can dynamically react to changes that occur in the given network environment. In other words, UAPS 206 can dynamically move the enforcement points for a given policy from one location to another depending on the dynamic changes in the network and the movement of the virtual machines. An enforcement point can correspond to a network device interface at which a given policy can be enforced using a policy enforcement engine. For example, in a network switch an ACL type policy enforcement engine can enforce an ACL type policy corresponding to a network switch interface, e.g., corresponding to a switch port. Often networking policies can be created and applied to the network device interfaces, with the interfaces representing the physical enforcing point.

Policy engine selection module 214 can select one or more enforcers along an efficient network path for a given network traffic flow and policy. For example, the user may desire communication between two specific groups of virtual machines residing on their respective virtualization hosts. In such a case, the user may create an appropriate policy to enable such communication between the groups of virtual machines and policy engine selection module 214 can determine which enforcement point would be optimal to enforce the given policy.

In one example, given a virtual machine associated with a virtualization host, UAPS 206 can determine at which switch port the given policy should be applied. However, if UAPS 206 determines that there exists a firewall network appliance along the network path for a given network traffic flow and the network switch connected to the virtualization host does not provide a firewall type of policy, UAPS 206 can apply the given policy at the firewall network appliance instead of applying at the network switch.

In one aspect of this application, users can create policies to be applied and provide these policies to UAPS 206, e.g., via user interface 204. UAPS 206 can then determine a best enforcing point to send these policies to in the network environment for a given network traffic flow.

Configure module 216 can configure the policy enforcement engines, i.e., 226, 232, and 236, on network devices 222, 228 and 234, respectively, based on unified API 208. For example, in response to policy selection module 214 selecting a policy enforcement engine, e.g., policy enforcement engine 232 associated with network device 228, for enforcing a given policy, configure module 216 can send API commands based on unified API 208 to the corresponding network device to add the given policy in a policy lookup table maintained at network device 228. In another example, if a policy enforcement engine is to be de-activated, configure module 216 may send API commands to edit or remove entries in corresponding policy lookup table so that the network device including this policy enforcement engine does not act as an enforcing point to apply the given policy.

In one aspect of this application, UAPS 206 may apply unified policy model module 212 to convert a unified API command to API commands that is specific to the policy enforcement engine.

Figure 3A:
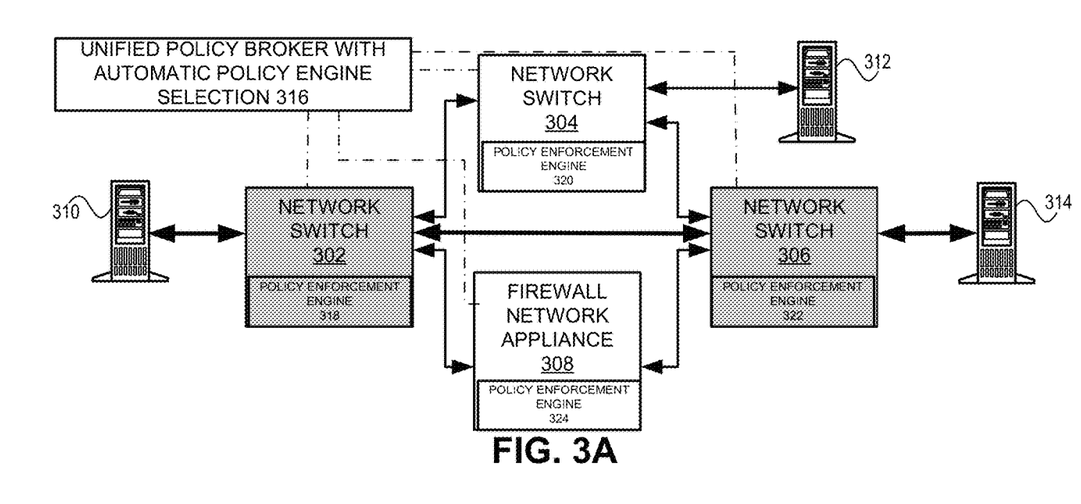
FIG. 3A illustrates an example network configuration with a first selected set of policy engines, according to one aspect of the instant application.

FIG. 3A illustrates an example network configuration with a first selected set of policy engines, according to one aspect of the instant application. The example shown in FIG. 3A illustrates a simple network configuration with multiple enforcement points where network policies may be enforced. Network ACLs may be configured on one or more switches, e.g., network switches 302-306. In other words, network switches 302-306 can be associated with ACL type policy enforcement engines 318-322, respectively. Firewall rules may be configured on a Firewall network appliance 308, i.e., associated with a firewall type policy enforcement engine 324. These policy enforcement engines can have different attributes. For example, switch ACLs can be typically limited in number but can have very low latency and firewall appliances may have much larger resource constraints but may have higher latency. Therefore, certain network traffic flows may traverse enforcers with different capabilities.

Referring to FIG. 3A, network switches 302 and 306 may have one set of ACL capabilities while network switch 304 may have a different set of capabilities in terms of available resources and performance characteristics. Given such a network environment or configuration (typically the network environment is complex and can include a large number of interconnected network devices), it may be desirable to determine an optimum set of enforcers to be used for a given network traffic flow (e.g., from server 310 to server 314). The dot-and-dashed lines from UAPS 316 to network devices 302-308 indicate that UAPS 316 can monitor, configure, and manage the different policy enforcement engines.

One aspect described in this application, provides an automated UAPS 316 that can query the enforcers associated with network switches 302-306 and firewall network appliance 308 for their attributes (or may have those attributes encoded in UAPS 316). Further, given a network traffic flow on which to provide enforcement, UAPS 316 can configure the enforcers in an efficient way to deliver the given network traffic flow with the desired performance attributes. In this example, UAPS 316 may determine that for a first network traffic flow the optimal option can be to apply ACLs on network switch 302 and network switch 306, i.e., applying ACL type policy enforcement engines 318 and 322. This is because, UAPS 316 may determine that policy enforcement engines 318 and 322 along the network path for the first network traffic flow may use scare resources (network switch ACLs) but will provide a very low latency flow.

Figure 3B:
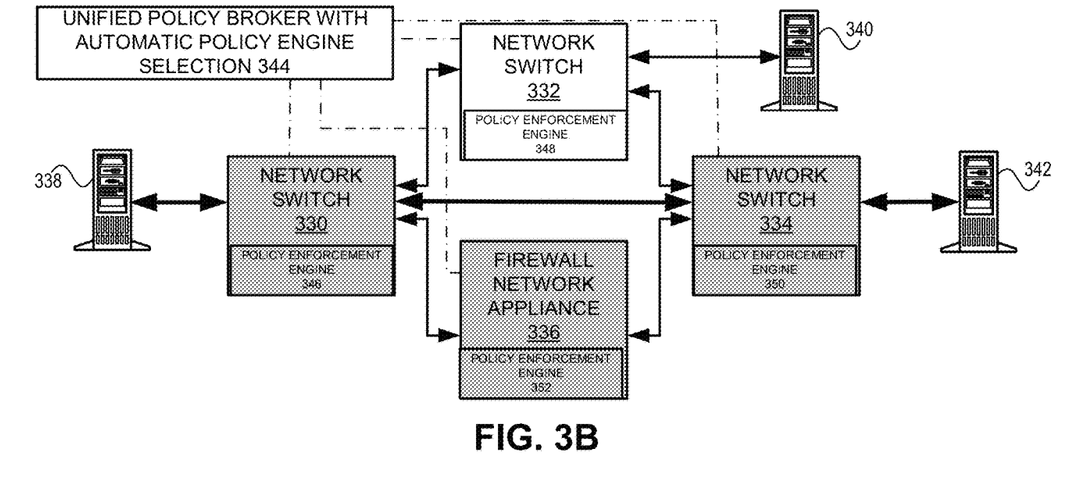
FIG. 3B illustrates an example network configuration with a second selected set of policy engines, according to one aspect of the instant application.

FIG. 3B illustrates an example network configuration with a second selected set of policy engines, according to one aspect of the instant application. The example shown in FIG. 3B is similar to the example network configuration in FIG. 3A. The dot-and-dashed lines from UAPS 344 to network devices 330-336 indicate the UAPS 344 can monitor, configure, and manage the different policy enforcement engines. UAPS 344 may determine that for a second network traffic flow an efficient path can be to direct the traffic through firewall network appliance 336 to provide the desired policy enforcement by applying policy enforcement engine 352.

UAPS 344 (in FIG. 3B) and UAPS 316 (in FIG. 3A) can create complex and inter-related configurations depending on the given network traffic flows, related performance characteristics, and available resources. UAPS (316 and 344) can also automatically react to changing network characteristics and can modify the policy configuration as appropriate to meet these dynamic changes in the network environment. Performing the above-mentioned tasks manually can be complex, time-consuming, and difficult, hence UAPS (316 and 244) facilitates the automatic selection of policy enforcement engines using a unified policy broker.

Figure 4A:
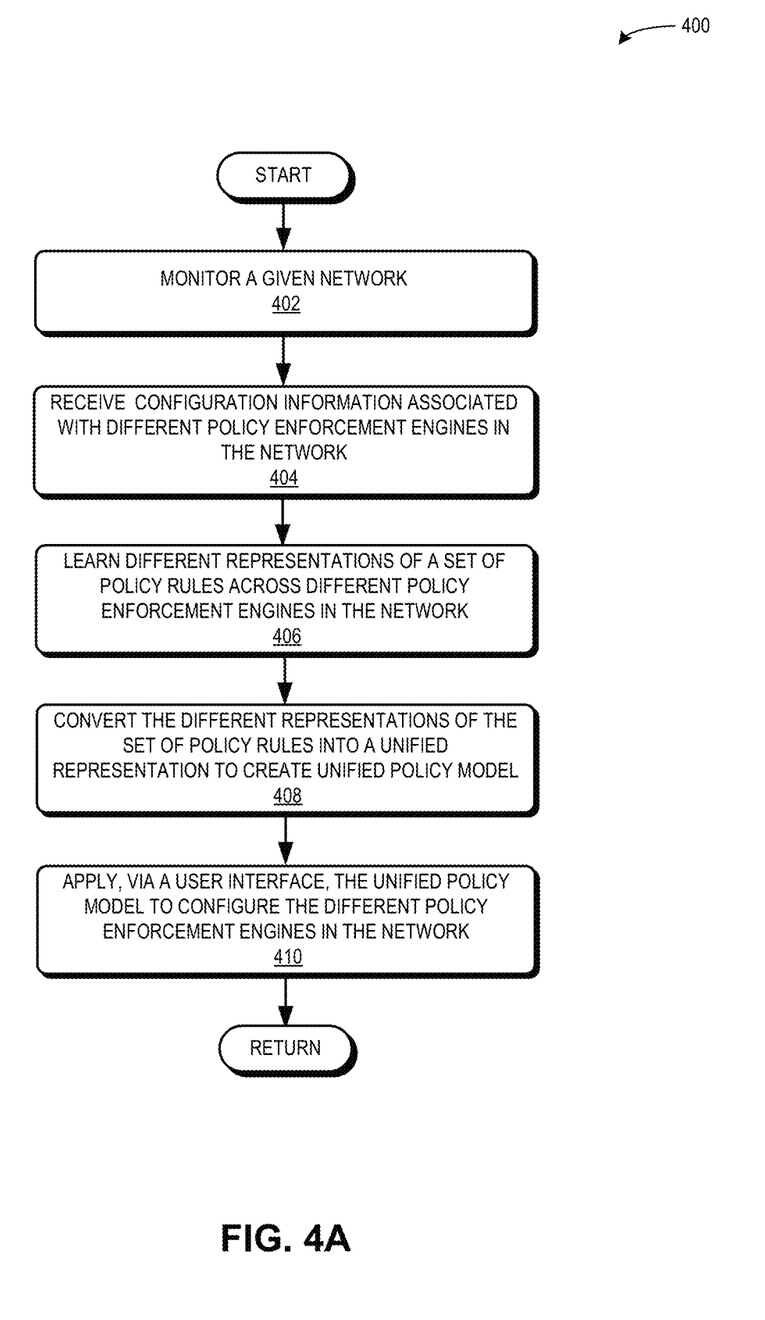
FIG. 4A presents a flowchart illustrating an example process for creating a unified policy broker, according to one aspect of the instant application.

FIG. 4A presents a flowchart illustrating an example process for creating a unified policy broker, according to one aspect of the instant application. Referring to flowchart 400 in FIG. 4A, during operation, the system can dynamically monitor a network (operation 402) to capture information associated with different policy enforcement engines. Based on the monitoring the system can receive configuration information associated with different policy enforcement engines in the network (operation 404).

The system may learn, based on the configuration information, different representations corresponding to a set of similar policy definitions across the different policy enforcement engines in the network (operation 406). The system may also learn different representations corresponding to set of different capabilities associated with a respective policy enforcement engine. The system may then convert the different representations of the set of policy rules into a unified representation to create a unified policy model (operation 408). For example, the system can map the different representations corresponding to the set of similar policy definitions to a unified representation. The system may then map the different representations corresponding to set of different capabilities to multiple unified representations, thereby retaining the useful differences that exist among the different policy enforcement engines. The system can create a unified policy model, or a unified policy broker based on the different mappings, thereby providing a unified API to a user via a user interface. Such a conversion can be desirable so that the system can apply, via a user interface, the unified policy model to configure the different policy enforcement engines (operation 410), the operation then returns.

Figure 4B:
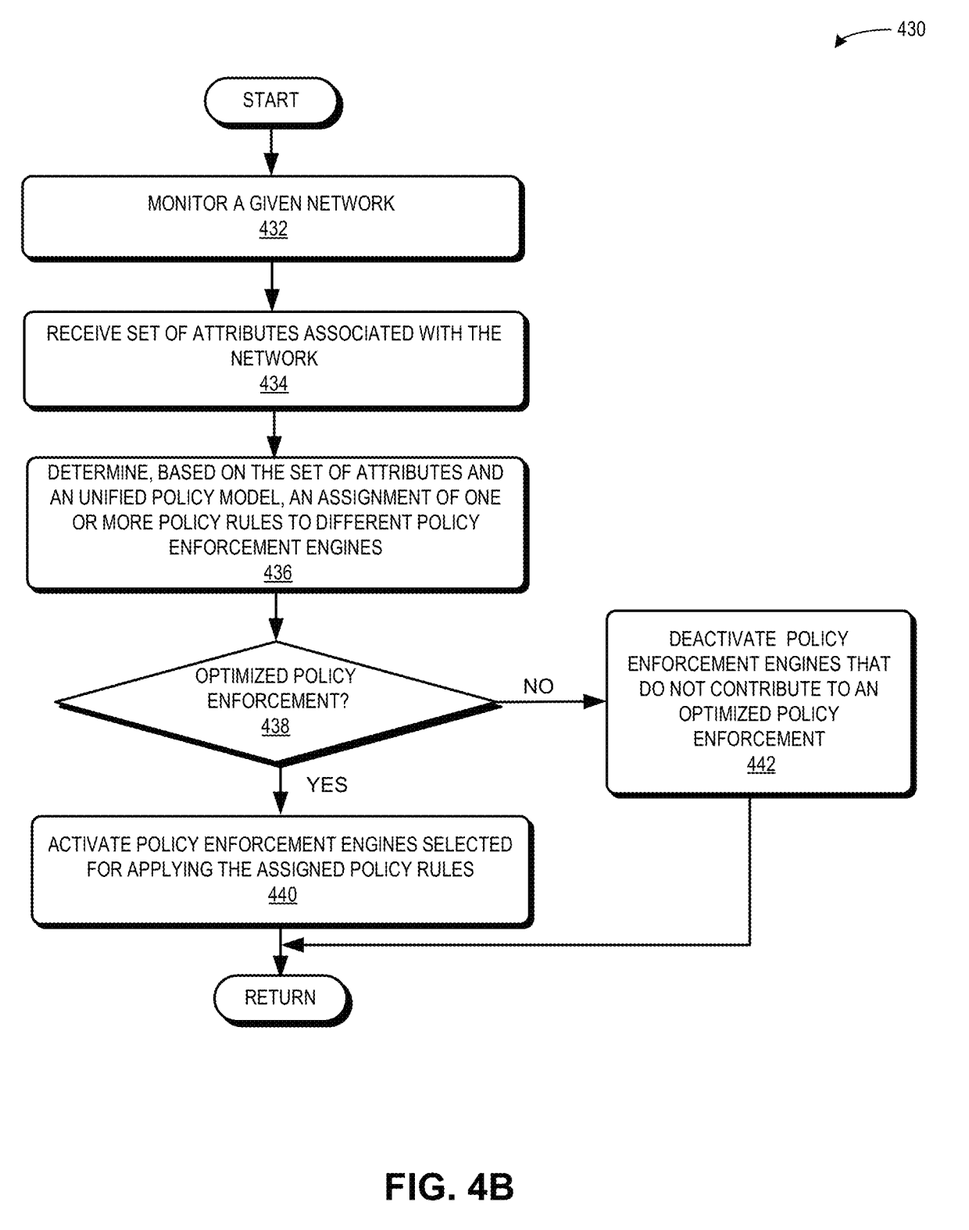
FIG. 4B presents a flowchart illustrating an example process for performing automatic policy engine selection based on a unified policy broker, according to one aspect of the instant application.

FIG. 4B presents a flowchart illustrating an example process for performing automatic policy engine selection based on a unified policy broker, according to one aspect of the instant application. One aspect described in the instant application can provide an automatic policy selection engine that can automatically select based on a unified policy broker one or more policy enforcement engines that exist along a network path without the user having to manually select them.

Referring to flowchart 430 in FIG. 4B, the system may dynamically monitor a given network (operation 432) and may receive a set of attributes associated with the network (operation 434). For example, the set of attributes can include network related attributes and network device related attributes. Network device related attributes can include amount of memory available at a network device, processing resource capability at the network device, number of policy rules supported by a policy enforcement engine associated with the network device, amount of latency the network device may add to a network flow. Network related attributes can include efficiency of a likely network path taken by a given network traffic flow, different types of policy enforcement engines that exist along the likely network path, and a current location of host that can be associated with one or more virtual machines under consideration. These network device related attributes and network related attributes can be relevant for determining whether an enforcing point can be enabled at one or more network devices along a network path taken by a given network traffic flow, and whether enabling the enforcing point can result in an optimized policy enforcement for a given set of policy rules.

The system may determine, based on the set of attributes and a unified policy model, an assignment of one or more given policy rules to different network devices for being enforced by corresponding policy enforcement engines (operation 436). The system can create the unified policy model based on a process described in FIG. 4A. The system may then determine whether such an assignment of policy rules results in an optimized policy enforcement (operation 438). For example, a first network device long a network path for a given network flow can support an ACL type policy enforcement engine, and a second network device along the network path may support a firewall type policy enforcement engine. The firewall type policy enforcement engine can include similar functionality like that in the ACL type policy enforcement engine. The system may determine, based on the set of attributes, which type of policy enforcement engine can be activated or deactivated to achieve an optimized policy enforcement.

For example, the set of attributes that the system may apply can include, a likely network path taken by the given traffic flow, different types of infrastructure that can exist along this network path, the different types of policy enforcement engines that exist along the network path, resource limitations, e.g., number of ACLs the ACL type policy enforcement engine can provide, etc. In one example, the system may select the firewall type of policy enforcement engine if this selection is the best option to apply the policy rules with optimal efficiency along the network path. The system can make such a selection because the firewall type policy enforcement engine can provide large memory resources to accommodate a large set of policy rules. In another example, the system may configure the ACL type policy enforcement engine with a first subset of policy enforcement rules and configure the firewall type of policy enforcement engine with a second subset of policy rules.

When the system determines that the condition in operation 438 is satisfied, the system may activate the policy enforcement engines that have been selected for applying the assigned policy rules (operation 440) and the operation returns. Activating a policy enforcement engine can involve sending one or more API commands to the policy enforcement engine for adding the assigned policy rules to a policy look up table. In one aspect, the system can apply the unified policy broker to generate the one or more API commands that are specific to the policy enforcement engine. In other words, when generating the one or more API commands, the system may convert the unified representations to policy enforcement engine specific representations. When the system determines that the condition in operation 438 is not satisfied, the system may deactivate one or more policy enforcement engines that may not contribute to an optimized policy enforcement (operation 442) and the operation returns. Deactivating the policy enforcement engine can involve sending one or more API commands to the policy enforcement engine for removing one or more policy rules from the policy look up table.

Computer System for Facilitating Automatic Policy Engine Selection

Figure 5:
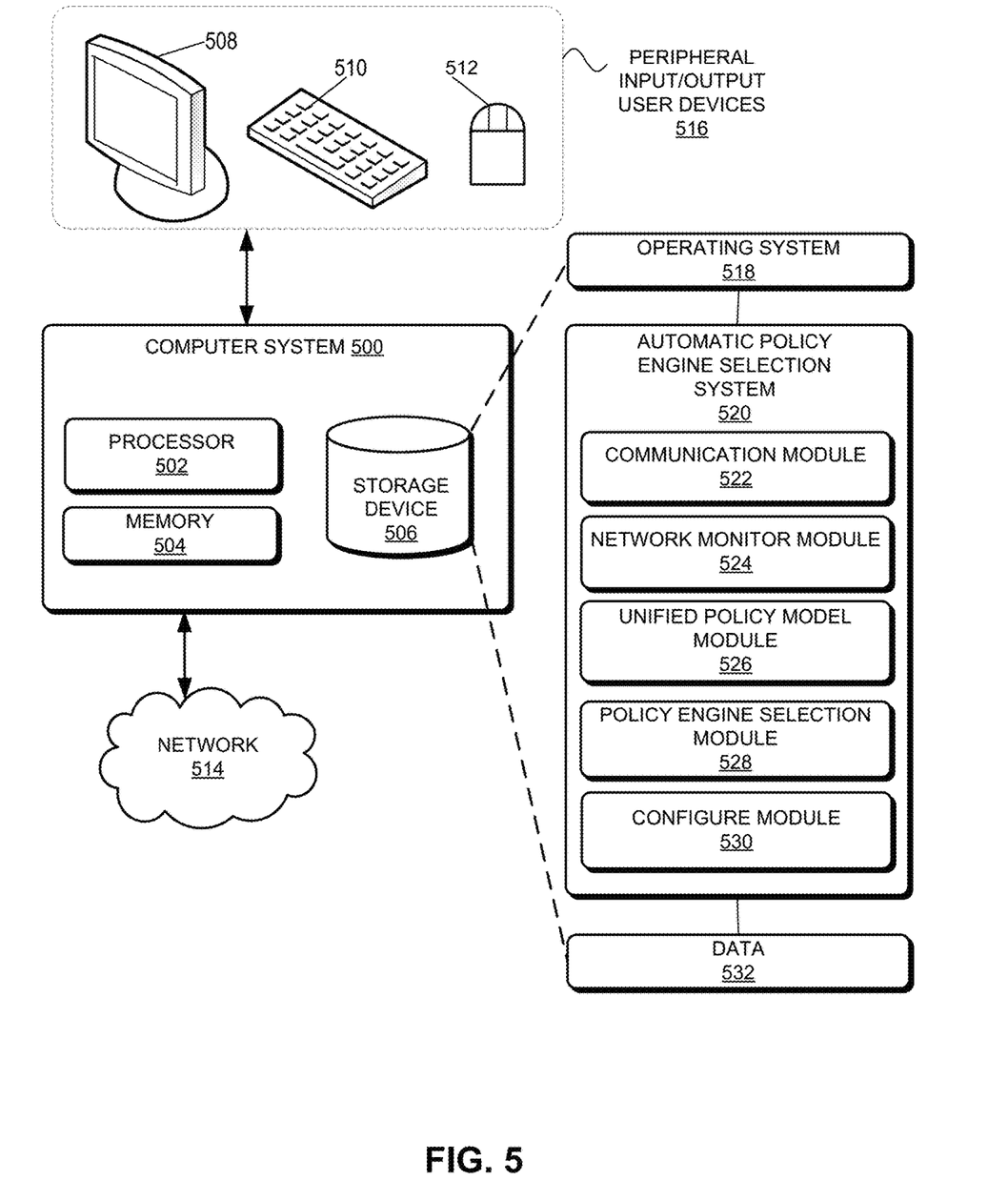
FIG. 5 illustrates an example computer system that facilitates an automatic policy engine selection based on a unified policy broker, according to one aspect of the instant application.

FIG. 5 illustrates an example computer system that facilitates an automatic policy engine selection based on a unified policy broker, according to one aspect of the instant application. In this example, computer system 500 can include a processor 502, a memory 504, a storage device 506. Computer system 500 can be coupled to peripheral input/output (I/O) user devices 516, e.g., a display device 508, a keyboard 510, and a pointing device 512. Storage device 506 can store instructions for an operating system 518, an automatic policy engine selection system 520, and data 532. Data 532 can include any data that is desirable as input or that is generated as output by the methods and/or processes described in this disclosure. Computer system 500 can be coupled via one or more network interfaces to a network 514.

In one aspect of this application, automatic policy engine selection system 522 can include instructions, which when executed by processor 502 can cause computer system 500 to perform methods and/or processes described in this disclosure. Automatic policy engine selection system 520 can include a communication module 522 for sending network packets to other nodes in network 514 via one or more network interfaces. Communication module 522 can also receive/obtain network packets from other network nodes in network 514 via one or more network interfaces. Automatic policy engine selection system 520 can further include instructions for implementing a network monitor module 524 for monitoring network 514 and network devices residing in network 514. Further, network monitor module 524 can apply communication module 522 to receive configuration information and a set of attributes associated with network 514 being monitored.

Automatic policy engine selection system 520 can include a unified policy module 526 to determine a unified representation of a set of policy definitions. In other words, policy enforcement engines associated with a respective network device in network 514 can be configured using a specific API, i.e., different policy enforcement engines can be configured with different API's. Each API can include a different representation or description of a set of policy definitions. For example, a first API associated with a first policy enforcement engine can provide a first representation of a policy definition, e.g., a policy rule, whereas a second API associated with a second policy enforcement engine can provide a second representation of a similar policy rule. Often a network can include multiple policy enforcement engines and multiple APIs. Configuring such policy enforcement engines with different APIs can be complex and difficult.

Automatic policy engine selection system 520 can apply unified policy module 526 to convert these different representations of policy definitions across different policy enforcement engines in the network into a unified representation or a unified API. In other words, unified policy module 526 can generate a first type of mapping between different representations of similar policy definition and a unified policy representation; and a second type of mapping between a set of different representations of different capabilities of policy enforcement engines and a set of unified representations instead of mapping such capability differences to a single unified representation. The first type of mapping provides a unified representation for the different representations of similar policy functions, whereas the second type of mapping preserves the differences in capabilities, e.g., performance characteristics, traffic enforcement options, etc., that exist among the different policy enforcement engines. Such a unified API can correspond to a unified policy broker that can be applied to configure the different policy enforcement engines.

Automatic policy engine selection system 520 can apply a policy engine selection module 528 to determine, based on the unified policy broker and the set of attributes, whether assigning a given subset of policy rules to one or more policy enforcement engines in network 514 for enforcing would result in an optimized policy enforcement. Policy engine selection module 528 can then select the policy enforcement engines for enforcing the corresponding subset of given policy rules. Configure module 530 can configure the selected policy enforcement engines so that they can enforce the assigned policy rules. In one aspect, when a policy enforcement engine along a network path is not selected, configure module 530 may configure it in way that the policy enforcement engine does not enforce the unassigned subset of given policy rules.

One aspect described in this application can provide a system and method for facilitating an automatic policy engine selection. During operation, the system can monitor a network including a set of network devices. The system can receive, based on the monitoring, a set of attributes associated with the network. At least two network devices are equipped with a different policy enforcement engine for enforcing one or more given policy rules. The system can apply a unified policy model to determine, based on the set of attributes, an assignment of the one or more given policy rules to the first policy enforcement engine and the second policy enforcement engine for providing an optimized policy enforcement. The system may then select based on the assignment, one or both of the first policy enforcement engine and the second policy enforcement engine. The system may activate the selected one or both policy enforcement engines for enforcing the one or more given policy rules.

In a variation on this aspect, the set of attributes includes one or more of network device related attributes: amount of memory available at a respective network device; processing resource capability at the network device; number of policy rules supported by a policy enforcement engine associated with the network device; and latency added to a given network traffic flow.

In a variation on this aspect, the set of attributes incudes one or more of network related attributes: efficiency of a likely network path taken by a given network traffic flow; different types of policy enforcement engines along the likely network path; and current location(s) of one or more hosts corresponding to one or more virtual machines.

In a variation on this aspect, the system can create, based on the set of attributes, the unified policy model which involves: receiving, at a controller, configuration information from a set of network devices residing in a network, wherein at least two network devices are equipped with a different policy enforcement engine with each policy enforcement engine associated with a different Application Programming Interface (API), wherein the API provides a different representation of a similar policy function; determining, based on the configuration information, different representations corresponding to a set of similar policy functions; and performing a first mapping from the different representations corresponding to the set of similar policy functions to a single unified representation.

In a variation on this aspect, the system can determine, based on the configuration information, different representations corresponding to a set of different capabilities across the policy enforcement engines. The system can perform a second mapping from the different representations corresponding to the set of different capabilities to multiple unified representations. Further, the system can create, based on the first mapping and the second mapping, the unified API including the first unified representation and the set of unified representations. The system can then apply the unified API to configure and manage the different policy enforcement engines in the network.

In a variation on this aspect, the system can activate the selected one or both policy enforcement engines for enforcing the one or more given policy rules by sending, based on the assignment, one or more commands to the selected policy enforcement engine(s) to add the one or more given policy rules in a policy lookup table associated with a corresponding network device.

In a variation on this aspect, the system can apply the unified policy model to determine, based on the set of attributes, the assignment of the one or more given policy rules to the first policy enforcement engine and the second policy enforcement engine for providing the optimized policy enforcement by: determining, based on the set of attributes and the given policy rules, that assigning a first policy rule to a first policy enforcement engine and a second policy rule to the second policy enforcement engine results in optimized policy enforcement, wherein the optimized policy enforcement indicates that enforcing the given policy rules by the corresponding policy enforcement engines satisfies one or more performance criteria.

In a variation on this aspect, the performance criteria can include one or more of: enforcing a first policy rule by one policy enforcement engine does not conflict with enforcing a second policy rule by another policy enforcement engine; assignment of the one or more policy rules among the different policy enforcement engines along a network path for a given network traffic flow provides for improved path efficiency; and amount of latency added by the selected policy enforcement engines is below a latency threshold.

In a further variation, the system can in response to determining that enforcing at least one policy rule by a policy enforcement engine does not provide the optimized policy enforcement, deactivate the policy enforcement engine from enforcing the policy rule.

In a further variation, the system can deactivate the policy enforcement engine from enforcing the policy rule by sending one or more API commands to the policy enforcement engine to remove the policy rule from a policy lookup table in a corresponding network device.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, ASIC chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of aspects have been presented for purposes of illustration and description. They are not intended to be exhaustive or to limit the scope of this disclosure to the forms disclosed. Accordingly, many modifications and variations will be apparent to practitioners skilled in the art.

What is claimed is:

1. A computer-implemented method comprising:
monitoring, by a controller, a network including a set of network devices;
receiving, based on the monitoring, a set of attributes associated with the network;
creating, based on the set of attributes, a unified policy model, wherein creating the unified policy model comprises:
receiving, at the controller, configuration information from the set of network devices, wherein at least two network devices are equipped with a different Application Programming Interface (API), wherein the API provides a different representation of a similar policy function;
wherein the at least two network devices are equipped with a first policy enforcement engine and a second policy enforcement engine, respectively, for enforcing one or more given policy rules;
applying the unified policy model to determine, based on the set of attributes, an assignment of the one or more given policy rules to the first policy enforcement engine and the second policy enforcement engine for providing an optimized policy enforcement, selecting, based on the assignment, one or both of the first policy enforcement engine and the second policy enforcement engine; and activating, by the controller, the selected one or both policy enforcement engines for enforcing the one or more given policy rules.

2. The computer-implemented method of claim 1, wherein the set of attributes includes one or more of network device related attributes:

amount of memory available at a respective network device;

processing resource capability at the network device;

number of policy rules supported by a policy enforcement engine associated with the network device; and latency added to a given network traffic flow.

3. The computer-implemented method of claim 1, wherein the set of attributes includes one or more of network related attributes:

efficiency of a likely network path taken by a given network traffic flow;

different types of policy enforcement engines along the likely network path; and current location(s) of one or more hosts corresponding to one or more virtual machines.

4. The computer-implemented method of claim 1, wherein creating the unified policy model further comprises:

determining, based on the configuration information, different representations corresponding to a set of similar policy functions; and performing a first mapping from the different representations corresponding to the set of similar policy functions to a single unified representation.

5. The computer-implemented method of claim 4, further comprising:

determining, based on the configuration information, different representations corresponding to a set of different capabilities across the policy enforcement engines;

performing a second mapping from the different representations corresponding to the set of different capabilities to multiple unified representations;

creating, based on the first mapping and the second mapping, the unified API including the first unified representation and the set of unified representations; and applying the unified API to configure and manage the different policy enforcement engines in the network.

6. The computer-implemented method of claim 1, wherein activating, by the controller, the selected one or both policy enforcement engines for enforcing the one or more given policy rules comprises:

sending, based on the assignment, one or more commands to the selected one or both policy enforcement engine to add the one or more given policy rules in a policy lookup table associated with a corresponding network device.

7. The computer-implemented method of claim 1, wherein applying the unified policy model to determine, based on the set of attributes, the assignment of the one or more given policy rules to the first policy enforcement engine and the second policy enforcement engine for providing the optimized policy enforcement further comprises:

determining, based on the set of attributes and the given policy rules, that assigning a first policy rule to a first policy enforcement engine and a second policy rule to the second policy enforcement engine results in optimized policy enforcement, wherein the optimized policy enforcement indicates that enforcing the given policy rules by the corresponding policy enforcement engines satisfies one or more performance criteria.

8. The computer-implemented method of claim 7, wherein the performance criteria include one or more of:

enforcing a first policy rule by one policy enforcement engine does not conflict with a second policy rule enforced by another policy enforcement engine;

assignment of the one or more policy rules among the different policy enforcement engines along a network path for a given network traffic flow provides for improved path efficiency; and amount of latency added by the selected policy enforcement engines is below a latency threshold.

9. The computer-implemented method of claim 1, further comprising:

in response to determining that enforcing at least one policy rule by a policy enforcement engine does not provide the optimized policy enforcement, deactivating the policy enforcement engine from enforcing the policy rule.

10. The computer-implemented method of claim 9, wherein deactivating the policy enforcement engine from enforcing the policy rule involves: sending one or more API commands to the policy enforcement engine to remove the policy rule from a policy lookup table in a corresponding network device.

11. A computer system, comprising:

a processor;

a memory coupled to the processor and storing instructions which, when executing by the processor, cause the processor to perform a method, the method comprising:

monitoring, by a controller, a network including a set of network devices;

receiving, based on the monitoring, a set of attributes associated with the network;

creating, based on the set of attributes, the unified policy model, wherein creating the unified policy model comprises:

receiving, at the controller, configuration information from the set of network devices, wherein at least two network devices are equipped with a different policy enforcement engine with each policy enforcement engine associated with a different Application Programming Interface (API), wherein the API provides a different representation of a similar policy function;

wherein the at least two network devices are equipped with a first policy enforcement engine and a second policy enforcement engine, respectively, for enforcing one or more given policy rules;

applying a unified policy model to determine, based on the set of attributes, an assignment of the one or more given policy rules to the first policy enforcement engine and the second policy enforcement engine for providing an optimized policy enforcement, selecting, based on the assignment, one or both of the first policy enforcement engine and the second policy enforcement engine; and activating, by the controller, the selected one or both policy enforcement engines for enforcing the one or more given policy rules.

12. The computer system of claim 11, wherein the set of attributes includes one or more of network device related attributes:

amount of memory available at a respective network device;

processing resource capability at the network device;

number of policy rules supported by a policy enforcement engine associated with the network device; and latency added to a given network traffic flow.

13. The computer system of claim 11, wherein the set of attributes includes one or more of network related attributes:

efficiency of a likely network path taken by a given network traffic flow;

different types of policy enforcement engines along the likely network path; and current location(s) of one or more hosts corresponding to one or more virtual machines.

14. The computer system of claim 11, wherein creating the unified policy model further comprises:

determining, based on the configuration information, different representations corresponding to a set of similar policy functions; and performing a first mapping from the different representations corresponding to the set of similar policy functions to a single unified representation.

15. The computer system of claim 14, the method further comprising:

determining, based on the configuration information, different representations corresponding to a set of different capabilities across the policy enforcement engines;

performing a second mapping from the different representations corresponding to the set of different capabilities to multiple unified representations;

creating, based on the first mapping and the second mapping, the unified API including the first unified representation and the set of unified representations; and applying the unified API to configure and manage the different policy enforcement engines in the network.

16. The computer system of claim 11, wherein activating, by the controller, the selected one or both policy enforcement engines for enforcing the one or more given policy rules comprises:

sending, based on the assignment, one or more commands to the selected policy enforcement engine(s) to add the one or more given policy rules in a policy lookup table associated with a corresponding network device.

17. The computer system of claim 11, wherein applying the unified policy model to determine, based on the set of attributes, the assignment of the one or more given policy rules to the first policy enforcement engine and the second policy enforcement engine for providing the optimized policy enforcement further comprises:

determining, based on the set of attributes and the given policy rules, that assigning a first policy rule to a first policy enforcement engine and a second policy rule to the second policy enforcement engine results in optimized policy enforcement, wherein the optimized policy enforcement indicates that enforcing the given policy rules by the corresponding policy enforcement engines satisfies one or more performance criteria.

18. The computer system of claim 11, wherein the performance criteria include one or more of:

enforcing a first policy rule by one policy enforcement engine does not conflict with a second policy rule enforced by another policy enforcement engine;

assignment of the one or more policy rules among the different policy enforcement engines along a network path for a given network traffic flow provides for improved path efficiency; and amount of latency added by the selected policy enforcement engines is below a latency threshold.

19. The computer system of claim 11, wherein the method further comprising:

in response to determining that enforcing at least one policy rule by a policy enforcement engine does not provide the optimized policy enforcement, deactivating the policy enforcement engine from enforcing the policy rule.

20. The computer system of claim 19, wherein deactivating the policy enforcement engine from enforcing the policy rule involves: sending one or more API commands to the policy enforcement engine to remove the policy rule from a policy lookup table in a corresponding network device.

* * * * *